United States Patent
Shao et al.

(10) Patent No.: US 7,508,811 B2
(45) Date of Patent: Mar. 24, 2009

(54) BEACON SCHEDULING IN WIRELESS PERSONAL AREA NETWORKS WITH MULTIPLE COORDINATORS

(75) Inventors: Huai-Rong Shao, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 765 days.

(21) Appl. No.: 10/888,400

(22) Filed: Jul. 10, 2004

(65) Prior Publication Data

US 2006/0007907 A1    Jan. 12, 2006

(51) Int. Cl.
*H04B 7/212* (2006.01)
(52) U.S. Cl. ...................... 370/347; 370/350
(58) Field of Classification Search ........... 370/314, 370/330, 336, 347, 350, 431, 432, 463, 479
See application file for complete search history.

(56) References Cited

U.S. PATENT DOCUMENTS

| | | | | |
|---|---|---|---|---|
| 6,865,609 | B1 * | 3/2005 | Gubbi et al. ........... | 709/230 |
| 7,110,380 | B2 * | 9/2006 | Shvodian ............... | 370/336 |
| 2005/0135275 | A1 * | 6/2005 | Hester et al. ........... | 370/256 |
| 2007/0258508 | A1 * | 11/2007 | Werb et al. ............. | 375/140 |

OTHER PUBLICATIONS

IEEE P802.15.4-2003, Wireless Medium Access Control (MAC) and Physical Layer (PHY) Specifications for Low-Rate Wireless Personal Area Netwoeks (LR-WPANs), 2003.
Marsden et al., Clarifications, Recommended Practices and Proposals for 802.15.4-2003, IEEE Submission, doc: IEEE 802.15-04-0093-00-004b, Mar. 11, 2003.
Lee et al., Enhancements to IEEE 802.15.4 (Rev. 1), IEEE Submission, doc: IEEE 802.15-04-0101-00-004b, Mar. 2004.

* cited by examiner

*Primary Examiner*—Sam Bhattacharya
(74) *Attorney, Agent, or Firm*—Dirk Brinkman; Gene Vinokur

(57) ABSTRACT

A method synchronizes transmissions through a channel in a wireless communications network including a device and a multiple coordinators within transmission range of the device. A superframe is defined to include a beacon period, a contention access period, and a contention free period. The beacon period includes multiple slots. In each coordinator, a particular beacon slot is selected to be non-conflicting with beacon slots selected by other coordinators. Beacons are then transmitted to the device by the coordinators at time periods associated with the selected slots.

19 Claims, 5 Drawing Sheets

US 7,508,811 B2

BEACON SCHEDULING IN WIRELESS PERSONAL AREA NETWORKS WITH MULTIPLE COORDINATORS

FIELD OF THE INVENTION

This invention relates generally to communication systems, and more particularly to medium access control using beacons in wireless networks.

BACKGROUND OF THE INVENTION

In wireless personal area networks (WPAN), common topologies are a 'star' network operating in infrastructure mode and a 'cluster' network operating in ad hoc mode. In a star network, all devices communicate indirectly with each other via a central device called a coordinator. The coordinator receives data from transmitting devices and forwards the data to receiving devices. In a cluster network, the devices communicate directly with each other.

In such networks, the very first device that starts a network is called the PAN coordinator. As the network evolves, other coordinators can join the network. In this case, a joining coordinator is called a 'child' coordinator that joins with an already existing 'parent' coordinator.

The operation of such networks can be according to the IEEE 802.15.3 and IEEE 802.15.4 standards, see IEEE Standard for Information technology—Telecommunications and information exchange between systems—Local and metropolitan area networks—Specific requirements "Part 15.3: Wireless Medium Access Control (MAC) and Physical Layer (PHY) Specifications for High Rate Wireless Personal Area Networks (WPANs)," 2003, and IEEE Standard for Information technology—Telecommunications and information exchange between systems—Local and metropolitan area networks—Specific requirements—"Part 15.4: Wireless Medium Access Control (MAC) and Physical Layer (PHY) Specifications for High Rate Wireless Personal Area Networks (WPANs)," 2003.

Because the signals transmitted by all devices share the same frequency channel, it is necessary to enforce a channel access methodology in order to efficiently utilize the network bandwidth. This can be done with a channel access schedule, which determines when and how terminals can access the channel. The access schedule can be broadcast periodically using a beacon, see FIG. 1.

The beacon 110 specifies network parameters, i.e., transmission rates, logical channels, network identifiers, and the channel access schedule. The period between successive beacon signals is called a superframe 100. The beacon is followed by a contention access period (CAP) 120 and a contention free period (CFP) 130. The beacon defines the start of the contention period, the start of the contention free period, and the access schedule for the contention free period. The beacon can also include other parameters as defined by the IEEE standard.

During the contention period, the devices compete with each other to gain access to the physical channel. Typically, a random access method such as Aloha or CSMA is used. After gaining access, devices transmit on the channel strictly according to the access schedule during the contention free period to guarantee interference free packet transmissions.

In a WPAN, there can be multiple coordinators within the same personal operating space (POS), see the IEEE 802.15.4-2003 standard, incorporated herein be reference. For a beacon enabled WPAN, the beacons sent by different coordinators can conflict with each other, directly or indirectly.

It absolutely necessary that the beacons 110 are received correctly for devices to operate in the WPAN.

FIG. 2 shows an example of direct beacon conflict. Here multiple coordinators 201-202 use the same physical channel, i.e., the same radio frequency band, for sending beacons 110 to device 210. The coordinators are within transmission range 203 of each other. If the coordinators concurrently send beacons 110 such that the transmission periods for two beacons overlap 205, then the multiple beacons collide at device 210 because CSMA/CA is not applied to beacon transmissions under the IEEE 802.15.4 standard. The direct conflict is due to the fact that a child coordinator joins the WPAN by associating a parent coordinator already in the WPAN. The direct conflict can also be caused by other conditions in which two coordinators are within each other's transmission range.

FIG. 3 shows an example of indirect interference. Two coordinators 301-302 choose the same physical channel. However, the two coordinators are out of transmission range with each other. However, device 300 is within range of both coordinators. If both coordinators concurrently send beacons 110, the beacons collide with each other at the device 300. This due to the fact that coordinator 301 is part of the WPAN when coordinator 302 joins. Because coordinator 302 is out of range of coordinator 301, coordinator 302 can chose the same channel as coordinator 301. The device 300 must be within the overlap area 310 to encounter indirect beacon conflict. This causes the device 300 to lose synchronization with its parent coordinator 301 and the device becomes an 'orphan' as defined by the standard. Even worse, the device cannot re-join with its parent coordinator through 'orphan scan' as specified in the IEEE 802.15.4-2003 standard.

As shown in FIG. 4, for a coordinator 400, direct beacon conflict occurs for devices within transmission range of the coordinator in a direct conflict area 401, and indirect beacon conflict occurs outside of range 401 but within double the transmission range in an indirect conflict area 402.

One solution for this interference problem at the network layer is described by Lee et al., in submission IEEE P802-802.15-04-0101-00-0004b, March 2004. That solution has three explicit collision detection requirements before a beacon can be sent.

Another solution uses ad-hoc beacons, see Marsden et al., in IEEE P802.15-15-04-0093-00-004b, March 2004. A centralized control method uses a relay device to connect two piconet controllers (PNCs) to handle beacon collisions. Another solution is described in U.S. patent application Ser. No. 10/434,948 filed on May 8, 2003.

SUMMARY OF THE INVENTION

The invention provides a method to synchronize transmissions through a channel in a wireless communications network including a device and a multiple coordinators within transmission range of the device.

The invention achieves this objective by broadcasting a channel access schedule using a beacon signal within each superframe.

A superframe is defined to include a beacon period, a contention access period, and a contention free period. The beacon period includes multiple slots.

In each coordinator, a particular beacon slot in the beacon period is selected to be non-conflicting with beacon slots

DETAILED DESCRIPTION OF THE PREFERRED EMBODIMENT

Direct Conflict

Figure 1:
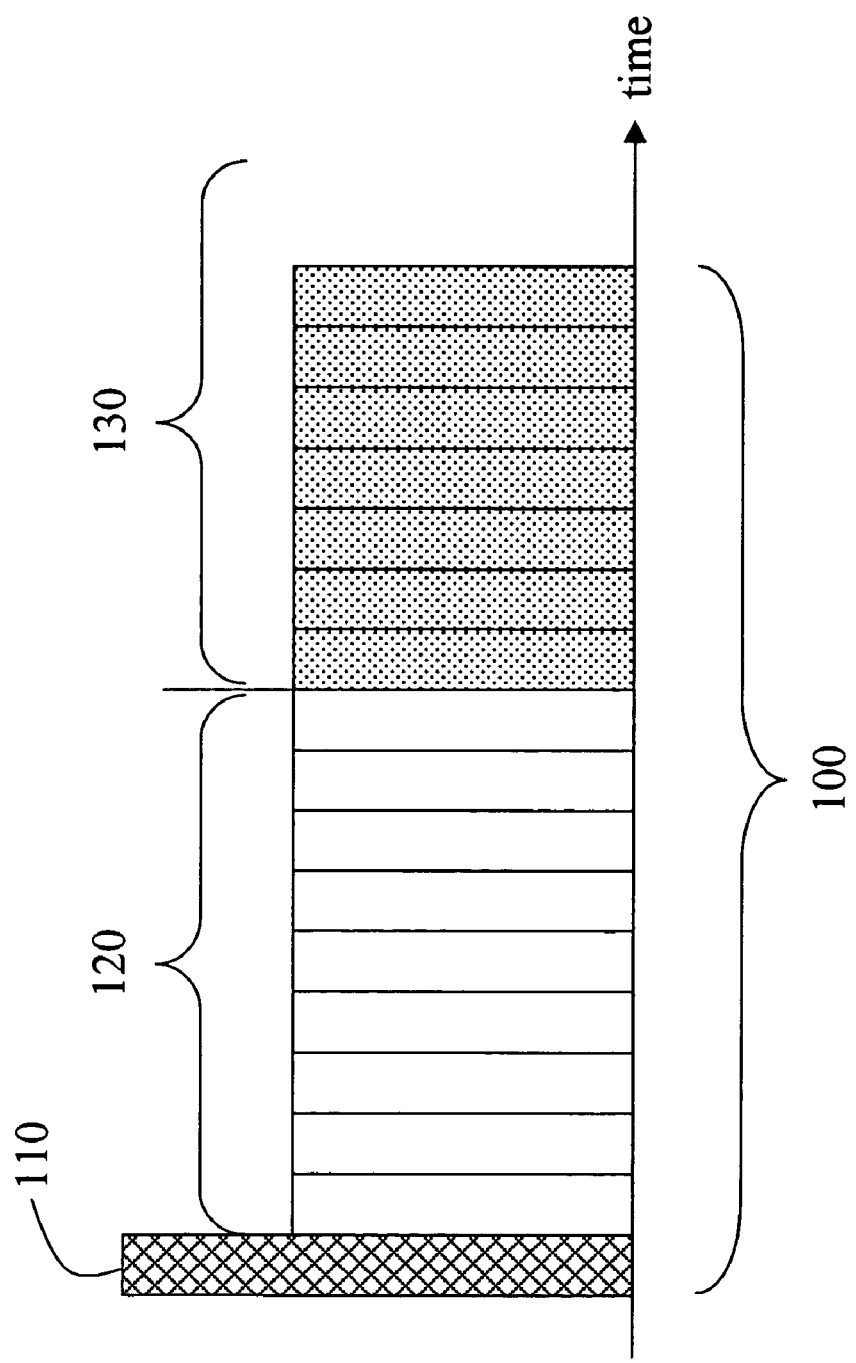
FIG. 1 is a diagram of a prior art superframe including a beacon.
Figure 2:
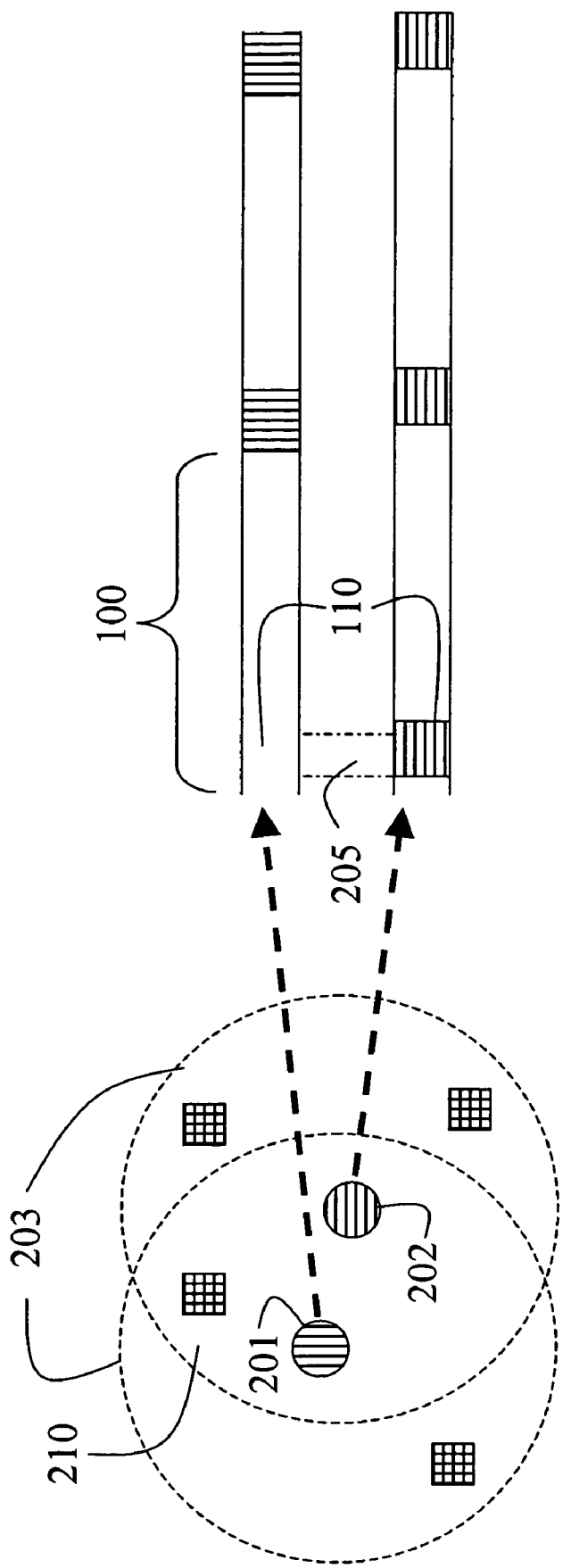
FIG. 2 is a diagram of direct conflict to be solved by the invention.
Figure 3:
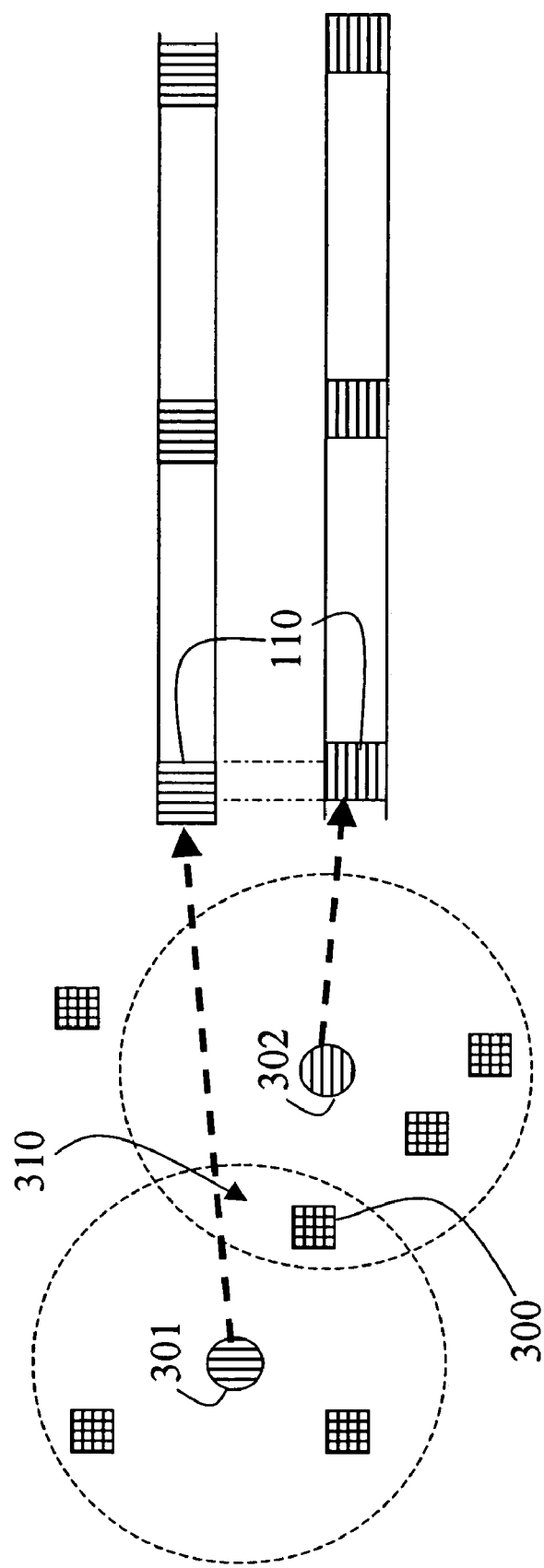
FIG. 3 is a diagram of indirect conflict to be solved by the invention.
Figure 4:
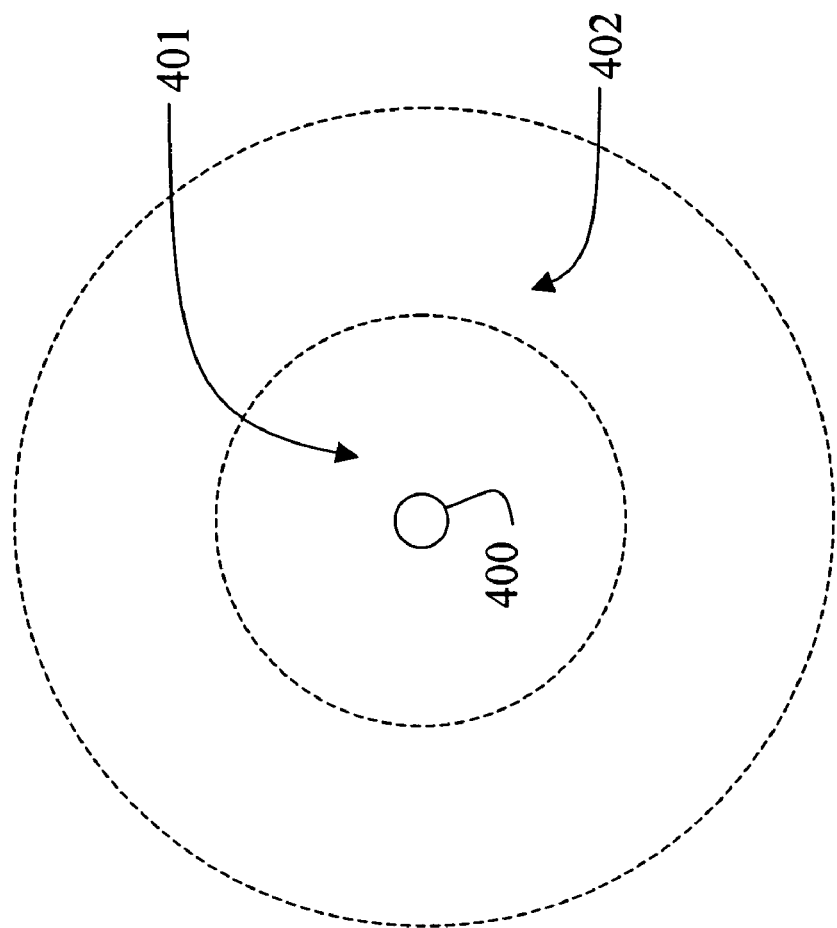
FIG. 4 is a diagram of direct and indirect conflict ranges to be solved by the invention.
Figure 5:
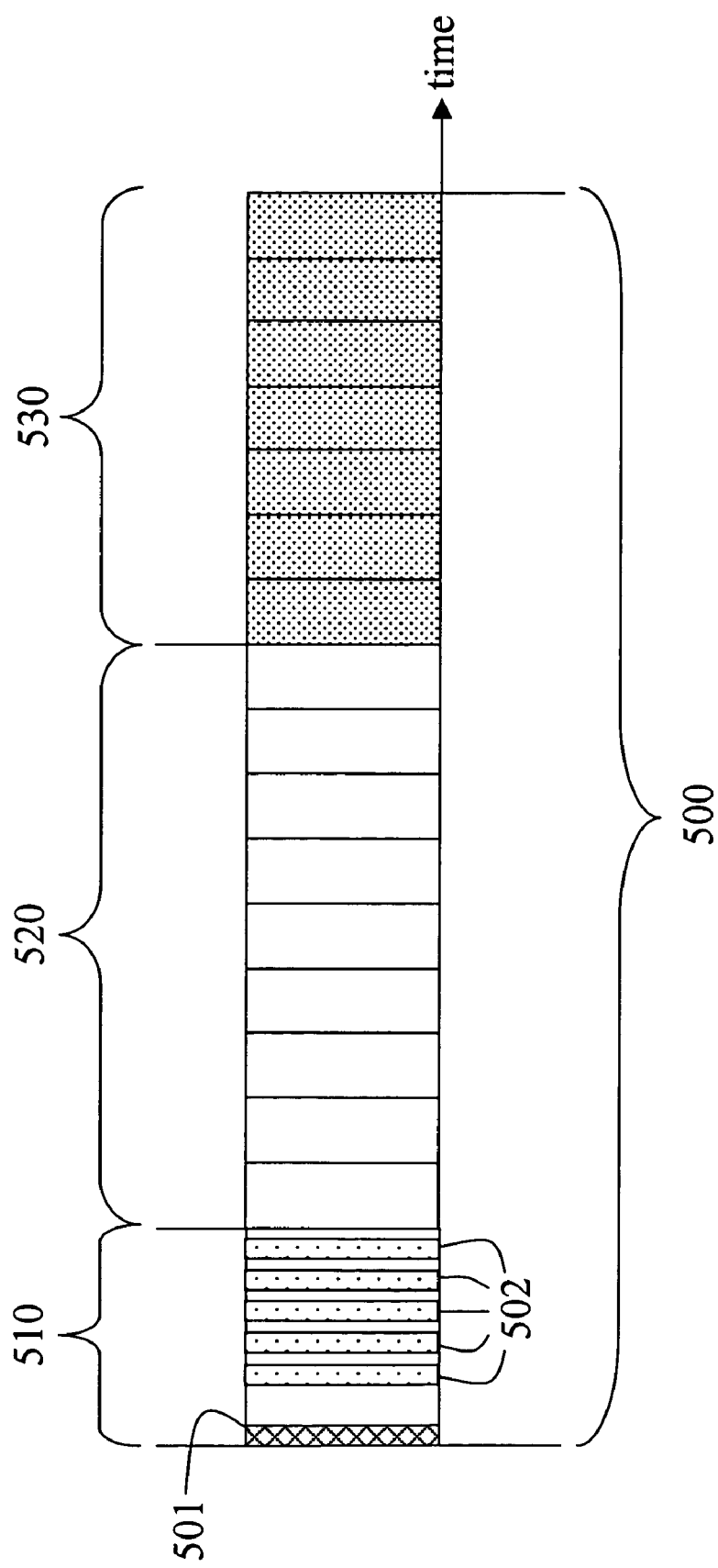
FIG. 5 is a diagram of a superframe including multiple beacons according to the invention.

FIG. 5 show a superframe 500 according to the invention. The superframe includes a beacon period 510, a contention access period 520, and a contention free period 530. The length of time of the beacon period is set by a personal area network (PAN) coordinator that is the very first device to form the network.

For example, the PAN coordinator sends a PAN beacon 501 at the beginning of beacon period 520. All other coordinators within its transmission range that join the WPAN later send non-conflicting beacons 502 at other times during the beacon period 510. A coordinator that is outside of the PAN coordinator's transmission range may send its beacons at the same time as the PAN coordinator without conflict.

There are a number of different ways that the coordinators, except the PAN coordinator, can select a time for sending their beacons 502.

A first method selects the time randomly to reduce the possibility of conflict.

In a second method, each coordinator includes the length of the beacon period 510, a length of its beacon 502, and a starting time of its beacon, with respect to the beginning of the superframe in its beacon itself when the coordinator joins the network. Then, as each additional coordinator joins the network, the additional coordinator can select its beacon to be non-conflicting with previously established beacons. This selection can also be made randomly from the remaining beacon free time within the beacon period 510.

A third method partitions the beacon period into equal sized time slots, and each coordinator randomly selects a free slot for its beacon transmission time. It should be noted that the IEEE 802.15.4-2003 standard allows beacons to have various size. Therefore, the slots have to be at least as long as the longest possible beacon time, or a single beacon can occupy several consecutive beacon slots.

In a fourth method, a coordinator senses the channel during a selected beacon slot period for several consecutive superframes, and then selects the beacon slot if the channel remains idle during this time.

In a fifth method, the parent coordinator detects beacon conflicts, and broadcasts the beacon conflict to other coordinators. In response to the notifications, the child coordinators can select their beacon transmission times.

The parameters related to the beacon period can be specified in the MLME-START parameter list, see Table 58 of the IEEE 802.15.4-2003 standard, incorporated herein by reference.

Indirect Conflict

Solving the indirect conflict problem is more difficult because a coordinator cannot directly receive beacons from other coordinators at the indirect conflict area 402.

There are two ways that the indirect conflict problem can be solved, reactively, i.e., after the conflict happens, and pro-actively, by avoiding conflicts in advance.

Reactive Indirect Conflict

In this method, a device that senses an indirect conflict notifies the associated coordinator of the conflict, including, perhaps, conflicting beacon parameters. In response to the notification, the coordinator can change its beacon to be non-conflicting.

Proactive Indirect Conflict

If a coordinator knows all other coordinators within its direct and indirect conflict area 402, then beacon conflicts can be avoided. However, as specified in the IEEE 802.15.4-2003 standard, a coordinator knows only its direct neighboring coordinators, i.e., other coordinators in the direct conflict area 401.

In one method, the device 300 in the overlap area 310 senses that it is within range of its parent coordinator and at least one other coordinator, by channel scanning. In response to sensing the conflict, the device notifies the conflicting coordinators by broadcasting the conflict information so the beacons can be adjusted to be non-conflicting. This can be done by having both the device and a coordinator sense for beacon request commands of coordinators and reply with the beacon information of its parent coordinator. In another method, each beacon in the beacon period 510 includes the timing parameters of some or all other beacons in the period.

To solve the indirect beacon conflict solution proactively, a coordinator needs to gather beacon information for all other coordinators within its direct and indirect areas in advance before collisions happen. This can be achieved by having the coordinator and all devices sense and reply to any beacon request command. In response, beacon timing information can be broadcast in a beacon information message to assist other coordinators in selecting non-conflicting beacon slots. For example, a coordinator sensing a beacon request command replies its own beacon information followed by a beacon time notification command.

Similar methods can be used to handle direct and indirect beacon conflicts among coordinators from different WPANs. If two WPANs are synchronized with each other, the same solution can be applied to handle beacon conflicts. If two WPANs are not synchronized with each other but have the same superframe size, the devices or the coordinators in the overlap area of the two WPAN can calculate the time relation between the two WPANs by analyzing the beacons from both WPANS. With the time relation, similar solutions can be applied.

If the two WPANs use different superframe sizes, the coordinator with the longest superframe maintains a table to record those time slots of the CAP and CFP allocated to beacons in the other WPAN. With such method, collisions between beacon and data frames can be avoided. Another solution is to set different transmission priorities for beacons and data frames to avoid collisions between beacons and data frames in the case that two WPANs have different superframe sizes.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for synchronizing transmissions through a common channel in a wireless communications network including a device and a plurality of coordinators within transmission range of the device, comprising:
    defining a superframe, the superframe including a beacon period, a contention access period, and a contention free period, the beacon period including a plurality of slots;
    selecting, in each coordinator, a particular beacon slot to be non-conflicting with beacon slots selected by other coordinators;
    transmitting, to the device, the beacons of the plurality of coordinators through a common channel during a time period associated with the selected slot.

2. The method of claim 1, in which the slot is selected randomly.

3. The method of claim 1, in which a first coordinator selects a first slot, and the beacon includes parameters related to the first slot, and each next coordinator selects a next slot according to the parameters of beacons in previously selected slots.

4. The method of claim 3, in which the parameters include a length of the beacon period, a length of the beacon, and a starting time of the beacon with respect to a beginning of the superframe.

5. The method of claim 3, in which the next slot is selected randomly.

6. The method of claim 1, in which the beacon period is partitioned into slots having equal sized time durations.

7. The method of claim 6, in which the channel is sensed during a plurality of consecutive superframes.

8. The method of claim 1, further comprising:
    sensing, in a particular coordinator, the channel during a time period associated with a particular slot; and
    selecting the slot if the channel is idle.

9. The method of claim 1, in which a particular coordinator select a plurality of consecutive slots, and the particular coordinator transmits the beacon through the channel during a time period associated with the plurality of consecutive slots.

10. The method of claim 1, further comprising:
    detecting beacon conflicts in a particular coordinator;
    broadcasting the beacon conflict; and
    selecting according to the beacon conflicts.

11. The method of claim 1, further comprising:
    detecting beacon conflicts in the device;
    broadcasting the beacon conflict; and
    selecting according to the beacon conflicts.

12. The method of claim 1, further comprising:
    sensing a conflicting beacon; and
    selecting a different beacon slot to be non-conflicting with the conflicting beacon slots.

13. The method of claim 1, in which a plurality of coordinators select beacon slots.

14. The method of claim 1, in which the plurality of coordinators are located in adjacent wireless networks.

15. The method of claim 1, further comprising:
    partitioning the beacon period into equal sized time slots.

16. The method of claim 1, a particular slots is at least as long as a longest possible beacon time.

17. The method of claim 1, in which a single beacon occupies a plurality of beacon slots.

18. The method of claim 1, further comprising:
    broadcasting beacon timing information in a beacon information message to assist the coordinators in selecting the non-conflicting beacon slots.

19. The method of claim 1, further comprising:
    sensing, in each coordinator a beacon request; and
    replying beacon information followed by a beacon time notification command.

* * * * *